United States Patent
Benakli et al.

(10) Patent No.: US 7,453,663 B1
(45) Date of Patent: Nov. 18, 2008

(54) DISK DRIVES WITH SERVO BURST PATTERNS RADIALLY OFFSET IN DIFFERENT RADIAL SPOKES OF A DISK AND METHODS OF POSITIONING BASED THEREON

(75) Inventors: Mourad Benakli, Shrewsbury, MA (US); Ara Patapoutian, Hopkinton, MA (US); Laurent Duchesne, Brookline, MA (US)

(73) Assignee: Maxtor Corporation, Longmont, CO (US)

( * ) Notice: Subject to any disclaimer, the term of this patent is extended or adjusted under 35 U.S.C. 154(b) by 175 days.

(21) Appl. No.: 11/011,989

(22) Filed: Dec. 14, 2004

Related U.S. Application Data

(60) Provisional application No. 60/578,464, filed on Jun. 9, 2004.

(51) Int. Cl.
G11B 15/46 (2006.01)
(52) U.S. Cl. .................. 360/77.08; 360/29; 360/48; 360/77.12
(58) Field of Classification Search .................. None
See application file for complete search history.

(56) References Cited

U.S. PATENT DOCUMENTS

| | | | | |
|---|---|---|---|---|
| 4,490,756 A | * | 12/1984 | Dost et al. | 360/77.11 |
| 4,511,938 A | * | 4/1985 | Betts | 360/77.08 |
| 5,041,926 A | * | 8/1991 | Ockerse et al. | 360/77.05 |
| 5,384,671 A | * | 1/1995 | Fisher | 360/51 |
| 5,523,902 A | * | 6/1996 | Pederson | 360/77.08 |
| 5,576,906 A | * | 11/1996 | Fisher et al. | 360/77.08 |
| 5,600,506 A | * | 2/1997 | Baum et al. | 360/78.14 |
| 5,796,543 A | * | 8/1998 | Ton-That | 360/77.08 |
| 5,838,511 A | * | 11/1998 | Haraya | 360/48 |
| 5,867,341 A | * | 2/1999 | Volz et al. | 360/77.08 |
| 5,892,634 A | * | 4/1999 | Ito et al. | 360/77.08 |
| 5,923,492 A | | 7/1999 | Liikanen | 360/77.08 |
| 5,986,847 A | * | 11/1999 | Le et al. | 360/78.14 |
| 6,052,250 A | * | 4/2000 | Golowka et al. | 360/77.08 |
| 6,128,153 A | * | 10/2000 | Hasegawa et al. | 360/77.08 |
| 6,157,511 A | * | 12/2000 | Liikanen | 360/77.08 |
| 6,198,584 B1 | * | 3/2001 | Codilian et al. | 360/48 |
| 6,256,160 B1 | | 7/2001 | Liikanen et al. | 360/48 |
| 6,366,423 B1 | * | 4/2002 | Ahn | 360/77.08 |
| 6,433,950 B1 | | 8/2002 | Liikanen | 360/77.08 |
| 6,519,107 B1 | * | 2/2003 | Ehrlich et al. | 360/75 |
| 6,535,348 B1 | * | 3/2003 | Kagami et al. | 360/78.08 |
| 6,590,728 B1 | * | 7/2003 | Yang | 360/48 |

(Continued)

*Primary Examiner*—Wayne R Young
*Assistant Examiner*—Dismery Mercedes
(74) *Attorney, Agent, or Firm*—Myers Bigel Sibley & Sajovec, P.A.

(57) ABSTRACT

A disk drive includes a rotatable disk, a transducer, an actuator, and a controller. The disk includes a first servo burst pattern in a first radial spoke of the disk, and a second servo burst pattern in a second radial spoke of the disk. The first and second servo burst patterns are radially offset from each other and are associated with a plurality of data tracks extending through the first and second radial spokes. The transducer is configured to read the first and second servo burst patterns on the disk to generate a servo burst signal. The actuator is configured to position the transducer relative to the disk. The controller is configured to control positioning of the transducer relative to the tracks on the disk based on the servo burst signal.

16 Claims, 6 Drawing Sheets

U.S. PATENT DOCUMENTS

| | | | |
|---|---|---|---|
| 6,590,729 B1 * | 7/2003 | Akagi et al. | 360/48 |
| 6,704,156 B1 * | 3/2004 | Baker et al. | 360/75 |
| 6,965,491 B1 * | 11/2005 | Perlmutter et al. | 360/77.04 |
| 7,006,316 B1 * | 2/2006 | Sargenti et al. | 360/51 |
| 7,027,257 B1 * | 4/2006 | Kupferman | 360/77.08 |
| 7,085,084 B2 * | 8/2006 | Yasuna et al. | 360/51 |
| 7,342,734 B1 * | 3/2008 | Patapoutian et al. | 360/29 |
| 2004/0252394 A1 * | 12/2004 | Hamaguchi et al. | 360/48 |

* cited by examiner

DISK DRIVES WITH SERVO BURST PATTERNS RADIALLY OFFSET IN DIFFERENT RADIAL SPOKES OF A DISK AND METHODS OF POSITIONING BASED THEREON

RELATED APPLICATION

This application claims the benefit of and priority to U.S. Provisional Patent Application No. 60/578,464, filed Jun. 9, 2004, and entitled "Radially Distributed Servo Burst Formats", the disclosure of which is hereby incorporated herein by reference as if set forth in its entirety.

FIELD OF THE INVENTION

The present invention relates to disk based storage devices and, more particularly, to positioning transducers based on servo burst patterns on the disk.

BACKGROUND OF THE INVENTION

A simplified diagrammatic representation of a disk drive, generally designated as 10, is illustrated in FIG. 1. The disk drive 10 includes a disk stack 12 (illustrated as a single disk in FIG. 1) that is rotated by a spindle motor 14. The spindle motor 14 is mounted to a base plate 16. An actuator arm assembly 18 is also mounted to the base plate 16.

The actuator arm assembly 18 includes a transducer 20 (or head) mounted to a flexure arm 22 which is attached to an actuator arm 24 that can rotate about a pivot bearing assembly 26. The actuator arm assembly 18 also includes a voice coil motor 28 which moves the transducer 20 relative to the disk 12. The spin motor 14, and actuator arm assembly 18 are coupled to a number of electronic circuits 30 mounted to a printed circuit board 32. The electronic circuits 30 typically include a digital signal processor (DSP), a microprocessor-based controller and a random access memory (RAM) device.

Referring now to the illustration of FIG. 2, the disk stack 12 typically includes a plurality of disks 34, each of which may have a pair of disk surfaces 36, 36. The disks 34 are mounted on a cylindrical shaft and are designed to rotate about axis 38. The spindle motor 14 as mentioned above, rotates the disk stack 12.

Referring now to the illustration of FIGS. 1 and 3, the actuator arm assembly 18 includes a plurality of the transducers 20, each of which correspond to one of the disk surfaces 36. Each transducer 20 is mounted to a corresponding flexure arm 22 which is attached to a corresponding portion of the actuator arm 24 that can rotate about the pivot bearing assembly 26. The VCM 28 operates to move the actuator arm 24, and thus moves the transducers 20 relative to their respective disk surfaces 36.

Although the disk stack 12 is illustrated having a plurality of disks 34, it may instead contain a single disk 34, with the actuator arm assembly 18 having a corresponding single actuator arm 24.

FIG. 4 further illustrates one of the disks 34. Data is stored on the disk 34 within a number of concentric tracks 40 (or cylinders). Each track is divided into a plurality of radially extending spokes 42 on the disk 34. Each spoke 42 is further divided into a servo spoke 44 and a data spoke 46. The servo spokes 44 of the disk 34 are used to, among other things, accurately position the transducer 20 so that data can be properly written onto and read from the disk 34. The data spokes 46 are where non-servo related data (i.e., user data) is stored and retrieved. Such data, upon proper conditions, may be overwritten.

FIG. 5 illustrates portions of data tracks 47 in two adjacent radial spokes 42 (FIG. 4) labeled m and m+1 on the disk 34, which are drawn in a straight, rather than arcuate, fashion for ease of depiction. To accurately write data to and read data from the data tracks 47 of the disk 34, it is desirable to maintain the transducer 20 in a relatively fixed position with respect to a given data track's centerline 48 during each of the writing and reading procedures (called a track following operation). Three data tracks 47 at radial locations labeled n−1 through n+1, including their corresponding centerlines 48, are shown in FIG. 5.

To assist in controlling the position of the transducer 20 relative to the data track centerline 48, the servo spokes 44 can contain a servo preamble 49 and servo burst patterns 50. The servo preamble 49 can include a write/read (W/R) recovery field, an automatic gain control (AGC) field, a synchronization field, a spoke (sector) number field, and/or a cylinder number field. For purposes of illustration only, the width of the servo burst patterns 50 have been exaggerated relative the width of the servo preamble 49. Fields of a servo spoke are illustrated in U.S. Pat. No. 6,256,160, which is incorporated herein by reference. Unlike information in the data spokes 46, the servo spokes 44 should not be overwritten or erased during normal operation of the disk drive 10.

The W/R recovery field can be used by the disk drive 10 to transition from writing data to a previous data track 47 to reading information in the present servo spoke 44. The AGC field can be used to set a gain of the read/write channel of the disk drive 10. The synchronization field can be used to synchronize a clock so that spoke (sector) and cylinder number fields can be read, and so that the servo burst patterns 50 can be located. The spoke number field can be indicative of the circumferential position of the servo region with respect to the disk 34. The cylinder number field can be indicative of a radial location of the servo region.

The servo burst patterns 50 can include one or more groups of servo bursts, as is well-known in the art. A servo burst pattern 50 that includes first, second, third and fourth servo bursts A, B, C and D, respectively, are shown in FIG. 5. The servo bursts A, B, C, D are accurately positioned relative to each other.

The transducer 20 is positioned relative to a data track 47 (i.e., during a track following operation) based on the servo burst patterns 50 which it reads as it crosses the servo spokes 44, one at a time. The servo burst patterns 50 are used to, among other things, generate a position error signal (PES) as a function of the misalignment between the transducer 20 and a desired position relative to the data track centerline 48. As is well-known in the art, the PES signals are input to a servo control loop (within the electronic circuits 30) which performs calculations and outputs a servo compensation signal which controls the VCM 28 to, ideally, place the transducer 20 at the desired position relative to the data track centerline 48.

A servo track writer (STW) is used to write the servo spokes 44, including their servo burst patterns 50, onto the surface(s) 36 of the disks 34 during the manufacturing process. The STW controls the transducers 20 corresponding to each disk surface 36 of the disks 34 to write the servo regions 44. In order to precisely write the servo burst patterns 50 at desired locations on the disks 34, the STW directs each transducer 20 to write in small steps, with each step having a pitch (i.e., servo track pitch 74 as shown in FIG. 5). FIG. 5 illustrates the relationship between the servo track width 75 and the servo track pitch 74 of the servo burst patterns 50 for a conventional disk drive system.

As used herein, the term "pitch" is the radial distance between centers of adjacent regions on the surfaces 36 of the disks 34. For example, the servo track pitch 74 is the distance between the centers of radially adjacent servo bursts (illustrated between servo bursts C and D). In contrast, the term "width" is the radial distance from one end to the other end of a single region. For example, the servo track width 75 is the width from one end to another end of a single servo burst (illustrated for servo burst D).

For servo spokes 44, the servo track pitch 74 is generally the same as the servo track width 75. For data spokes 46, the data track pitch 76 is generally different from the data track width 78 due to, for example, the presence of erase bands which are typically formed between radially adjacent data tracks 47. For purposes of illustration only, the data track width 78 and the servo track width 75 have been shown to be about the same. However, it is to be understood that their relative sizes can be different, and that the servo track width 75 is generally about ⅔ of the data track width 78.

As shown in FIG. 5, the centerline 48 of the data tracks 47 can be aligned along a centerline of groups of the servo burst patterns 50. When the data track pitch 78 and the servo track pitch 74 are constant across the disk 34, the centerline 48 of the data tracks 47 can remain aligned with a centerline of the groups of servo burst patterns 50. The centerline 48 of the data tracks 47 may, for example, then be aligned as shown in FIG. 5, or between servo bursts A and B. However, in some disk drives the data track pitch 76 can vary radially across the disk 34, such that the alignment of the data tracks 47 and the servo burst patterns 50 varies radially across the disk 34. Referring now to FIGS. 5 and 6, the effect of radial variation in data track pitch on the offset between data tracks 47 and servo burst patterns 50 is illustrated.

FIG. 6 illustrates portions of data tracks 47 at three radial locations labeled track p−1 to track p+1, which are in the same adjacent spokes 42 labeled m and m+1 as shown in FIG. 5. The data tracks 47 have a data track pitch 600 that is different from the data track pitch 76 shown in FIG. 5 and, consequently, the centerlines 48 of the data tracks 47 shown in FIG. 6 are offset by an amount 62 from reference centerlines 60 of the servo bursts A, B, C, D. The data tracks 47 also have a data track width 602 that is generally the same as, but can be different from, the data track width 78 shown in FIG. 5.

Accordingly, as shown by FIGS. 5 and 6, the alignment between the data tracks 47 and the servo bursts A, B, C, D varies radially across the disk 34. The PES that is generated from the servo bursts A, B, C, D can have a gain error that varies based on radial location of the transducer 20 within the servo bursts A, B, C, D. Accordingly, some of the tracks 47, such as tracks n−1 to n+1, may have less gain error than other tracks 47, such as tracks p−1 to p+1, because of the alignment of the track centerlines 48 and the servo bursts A, B, C, D. Consequently, the transducer 20 may be positioned more accurately relative to some of the tracks 47 than other of the tracks 47.

SUMMARY OF THE INVENTION

In some embodiments of the present invention, a data storage disk has servo information thereon that includes first and second servo burst patterns. The first servo burst pattern is in a first radial spoke of the disk. The second servo burst pattern is in a second radial spoke of the disk, and is radially offset from the first servo burst pattern. The first and second servo burst patterns are associated with a plurality of data tracks extending through the first and second radial spokes.

The data tracks can have a data track pitch that varies radially across the disk. Accordingly, the first servo burst pattern can be more closely aligned with some of data tracks than the second servo burst pattern, and the second servo burst pattern can be more closely aligned with some other of the data tracks than the first servo burst pattern. Accordingly, based on the radial location of a data track that is to be followed, the first servo burst pattern, in the first radial spoke, or the second servo burst pattern, in the second radial spoke, may be relied upon more for positioning of a transducer. The first servo burst pattern and the second servo burst pattern may alternately repeat in a plurality of radial spokes around the disk.

The first servo burst pattern may include a first preamble and a first plurality of servo bursts. A phase of the first preamble and a phase of at least one of the first plurality of servo bursts may have a first relative phase difference. The second servo burst pattern can include a second preamble and a second plurality of servo bursts. A phase of the second preamble and a phase of at least one of the second plurality of servo bursts have a second relative phase relationship that is different than the second relative phase difference. Accordingly, the first servo burst pattern in the first radial spoke may be distinguished from the second servo burst pattern in the second radial spoke based on the first and second relative phase relationships. For example, the first preamble may be substantially in phase with at least one of the first plurality of servo bursts, and the second preamble may be substantially out-of-phase (e.g., about 180° out of phase) with at least one of the second plurality of servo bursts.

The first servo burst pattern may include a first synchronization field and/or a first spoke number field that is indicative of the first radial spoke of the disk, and the second servo burst pattern may include a second synchronization field and/or a second spoke number field that is indicative of the second radial spoke of the disk.

In some other embodiments of the present invention, a disk drive includes a rotatable disk, a transducer, an actuator, and a controller. The disk includes a first servo burst pattern in a first radial spoke of the disk, and a second servo burst pattern in a second radial spoke of the disk. The first and second servo burst patterns are radially offset from each other and are associated with a plurality of data tracks extending through the first and second radial spokes. The transducer is configured to read the first and second servo burst patterns on the disk to generate a servo burst signal. The actuator is configured to position the transducer relative to the disk. The controller is configured to control positioning of the transducer relative to the tracks on the disk based on the servo burst signal.

The controller may be configured to align the transducer with the first data track based on the first servo burst pattern, and to align the transducer with the second data track based on the second servo burst pattern. The controller may be configured to align the transducer with the first data track based more on the first servo burst pattern than on the second servo burst pattern, and to align the transducer with the second data track based more on the second servo burst pattern than on the first servo burst pattern. The controller may be configured to distinguish the first servo burst pattern from the second servo burst pattern based on a relative phase of a preamble and at least one of the plurality of servo bursts of each of the first and second servo burst patterns, and/or based on an synchronization field and/or a spoke number field in the preambles.

Yet some other embodiments of the present invention provide methods of controlling positioning of a transducer that is adjacent to a rotatable disk in a disk drive. A servo burst pattern in a radial spoke of the disk is sensed. The sensed servo burst pattern is identified as one of a plurality of different types of servo burst patterns, which are in different radial spokes of the disk. Positioning of the transducer is controlled based on the identified type of the sensed servo burst pattern.

A contribution of the sensed servo burst pattern to positioning of the transducer relative to a data track on the disk may be varied based on the identified type of the sensed servo burst pattern. The transducer may be positioned relative to a track based more on a first type servo burst patterns than based on a second type of servo burst pattern when the transducer is in a first radial spoke of the disk, and may be positioned relative to the track based more on the second type servo burst patterns than based on the first type of servo burst pattern when the transducer is in a second radial spoke of the disk.

DETAILED DESCRIPTION OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items.

The present invention may be embodied as servo controllers, disk drives, methods, and/or computer program products. Accordingly, the present invention may be embodied in hardware and/or in software (including firmware, resident software, micro-code, etc.). Consequently, as used herein, the term "signal" may take the form of a continuous waveform and/or discrete value(s), such as digital value(s) in a memory or register. Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The present invention is described below with reference to block diagrams, including operational flow charts, of servo controllers, disk drives, methods, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 7:
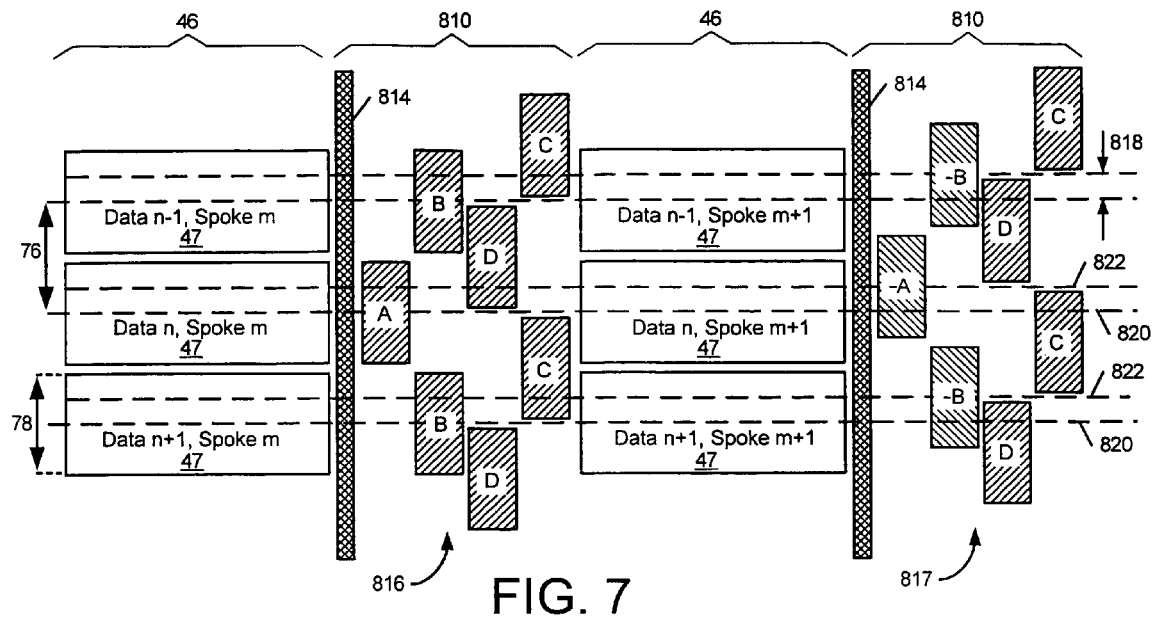
FIG. 7 is a top view of a disk, and illustrates portions of tracks at radial locations n−1 to n+1 in two adjacent spokes in accordance with some embodiments of the present invention.

Referring to FIG. 7, the disk 34 includes the data spokes 46 and servo spokes 810. Two adjacent servo spokes 810 and data tracks 47 at circumferential locations m and m+1 are shown in FIG. 7. Data tracks 47 at three radial locations n−1 through n+1 extend circumferentially around the disk 34 in the data spokes 46. The servo spokes 810 include each include a servo preamble 814 and servo burst patterns. The servo preamble 814 may include a write/read (W/R) recovery field, an automatic gain control (AGC) field, a synchronization field, a spoke (sector) number field, and/or a cylinder number field. In accordance with various embodiments of the present invention, adjacent servo spokes 810 include servo bursts patterns 816 and 817 that are radially offset from each other.

In the exemplary embodiment shown in FIG. 7, the servo bursts patterns 816 and 817 each include A, B, C, D servo bursts. The A, B, C, D servo bursts in servo burst pattern 816 of spoke m have exemplary centerlines 820 that extend through centers of servo bursts A and B, and between servo bursts C and D. Similarly, the A, B, C, D servo bursts in servo burst pattern 817 of spoke m+1 have centerlines 822. The servo burst patterns 816, 817 are offset from each other as shown by an offset 818 between the centerlines 820 and 822. The locations of centerlines 820 and 822 of the servo burst patterns 816, 817 have been selected for purposes of illustration only, it being understood that the centerlines 820 and 822 may be defined at other radial locations relative to the servo burst patterns 816, 817, such as between the A and B servo bursts therein.

For purposes of illustration only, the offset 818 has been illustrated as about one-quarter of the width of the data tracks 47. The data tracks 47 at radial locations n−1 to n+1 have centerlines that coincide with the centerlines 820 of the servo burst patterns 816, and are radially offset from the centerlines 822 of the servo burst patterns 817. Accordingly, the servo burst patterns 816 of servo spoke 810 at location m may provide more accurate information for positioning the transducer 20 relative to the tracks 47 at radial locations n−1 to n+1 than the information from the servo burst patterns 817 of servo spoke 810 at adjacent location m+1.

Figure 8:
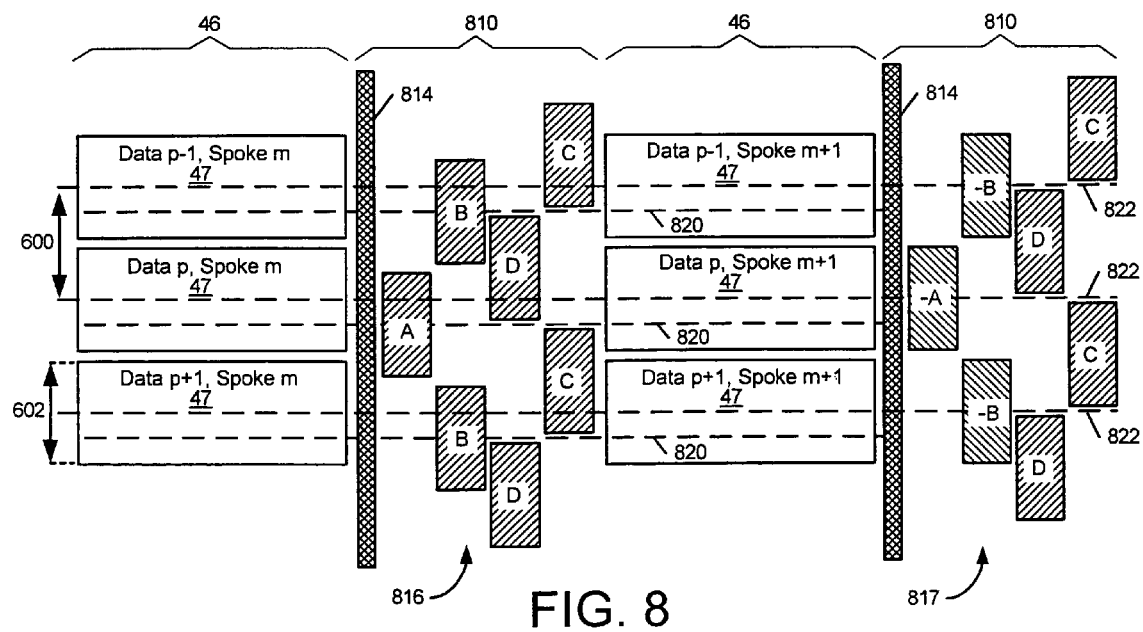
FIG. 8 is a top view of a disk, and illustrates portions of tracks at radial locations p−1 to p+1 in two adjacent spokes in accordance with some embodiments of the present invention.

FIG. 8. illustrates data tracks 47 at radial locations p−1 to p+1 on the disk 47. The data tracks 47 have centerlines that now coincide with the centerlines 822 of the servo burst patterns 817, and are radially offset from the centerlines 820 of the servo burst patterns 816. Accordingly, the servo burst patterns 817 of servo spoke 810 at location m+1 may provide more accurate information for positioning the transducer 20 relative to the tracks 47 at radial locations p−1 to p+1 than the information from the servo burst patterns 816 of servo spoke 810 at adjacent location m.

The servo burst patterns 816, 817 of the adjacent servo spokes 810, with the radial offset between the servo burst patterns therein, may alternately repeat in a plurality of the servo spokes 810 around the disk 34. Accordingly, the servo burst patterns 816 may be included in "even servo spokes" and the servo burst patterns 817 may be included in "odd servo spokes", such that the transducer 20 passes over the even servo spokes and odd servo spokes in an alternating manner. It is to be understood, however, that more than two types of servo burst patterns that are radially offset from each other may be included in different servo spokes 810 around the disk 34. For example, first, second, and third servo burst patterns can be radially offset from each other and included in first, second, and third ones of the servo spokes 810 in an alternating manner around the disk 34.

Figure 1:
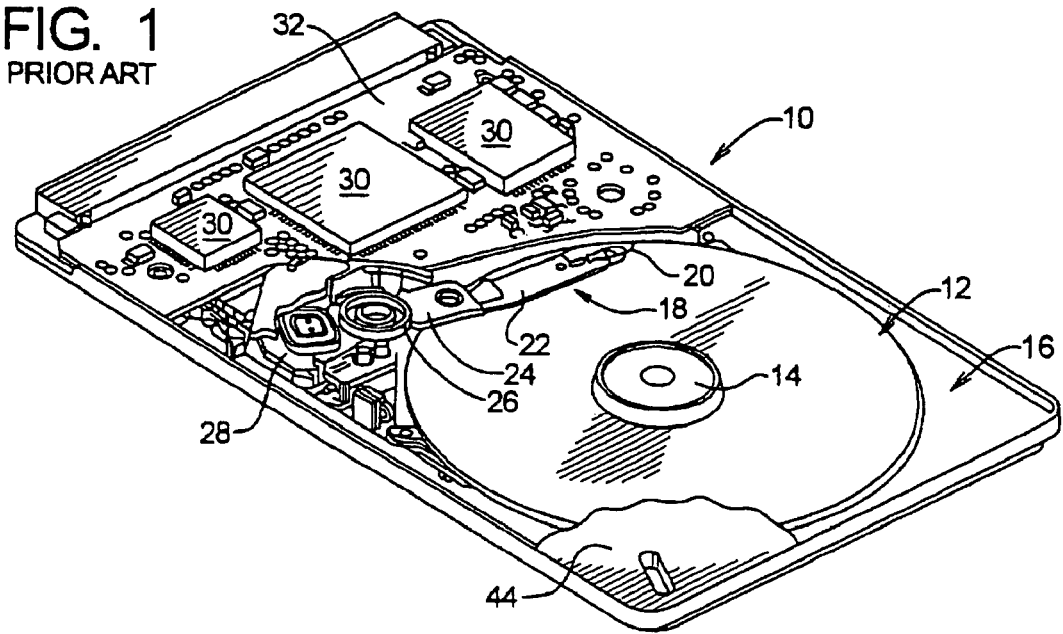
FIG. 1 is a perspective view of a conventional disk drive.
Figure 2:
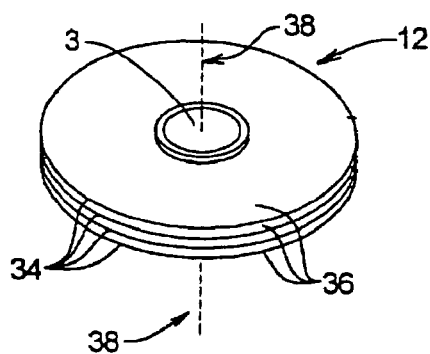
FIG. 2 is a perspective view of a conventional disk stack having a plurality of hard disks.
Figure 3:
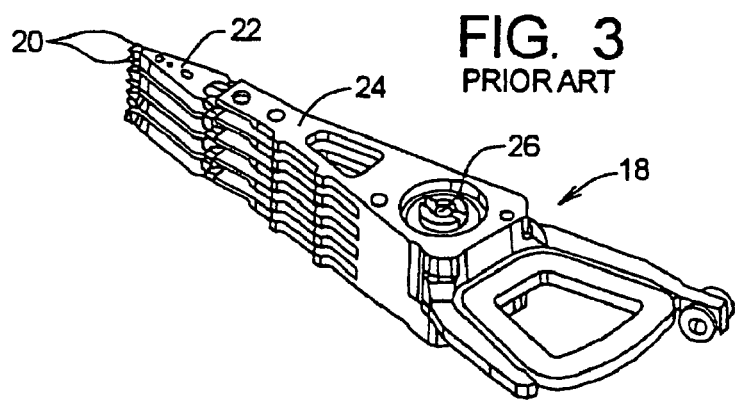
FIG. 3 is a perspective view of a portion of an actuator arm assembly having a plurality of actuator arms.
Figure 4:
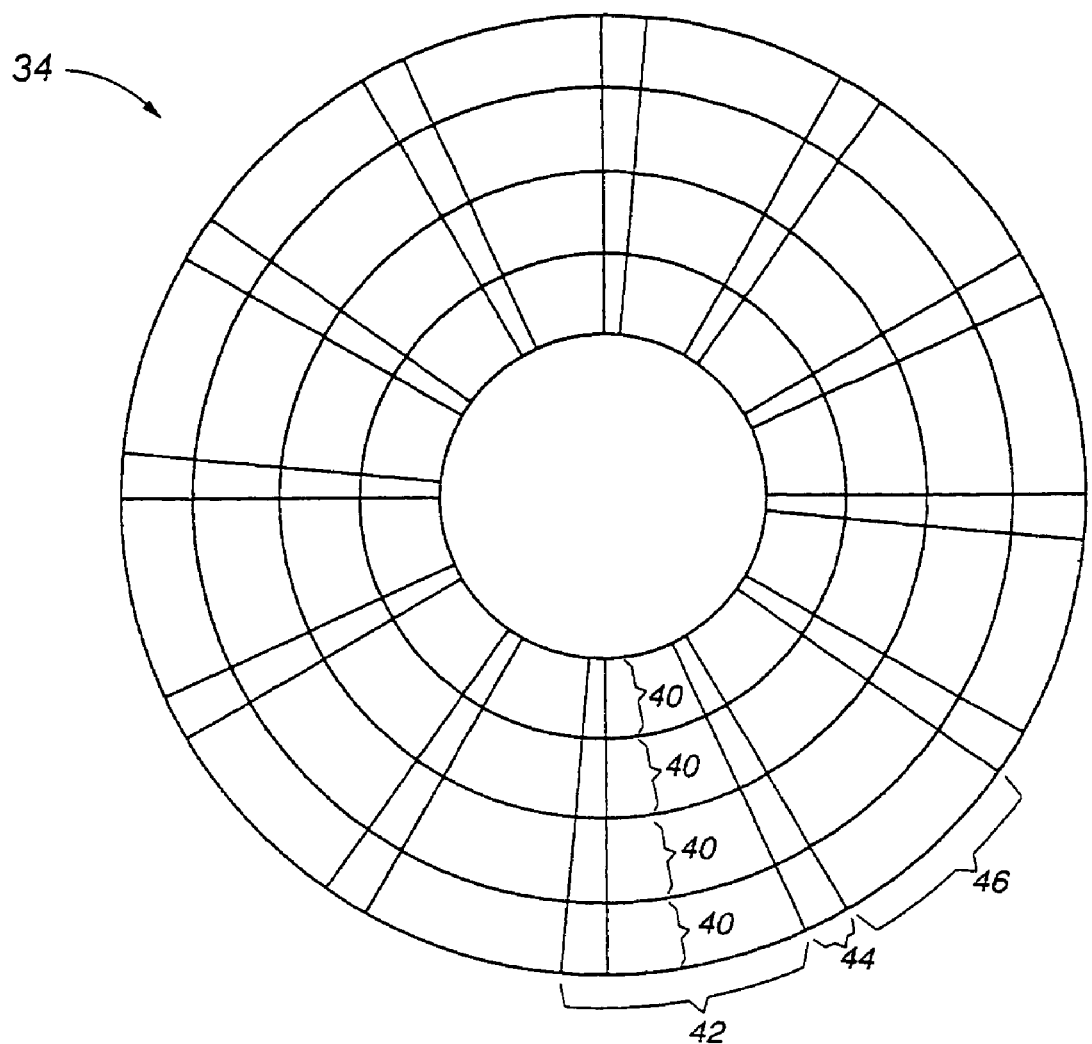
FIG. 4 is a top view a conventional disk and illustrates tracks and spokes, with each of the spokes being divided into a servo spoke and a data spoke.
Figure 5:
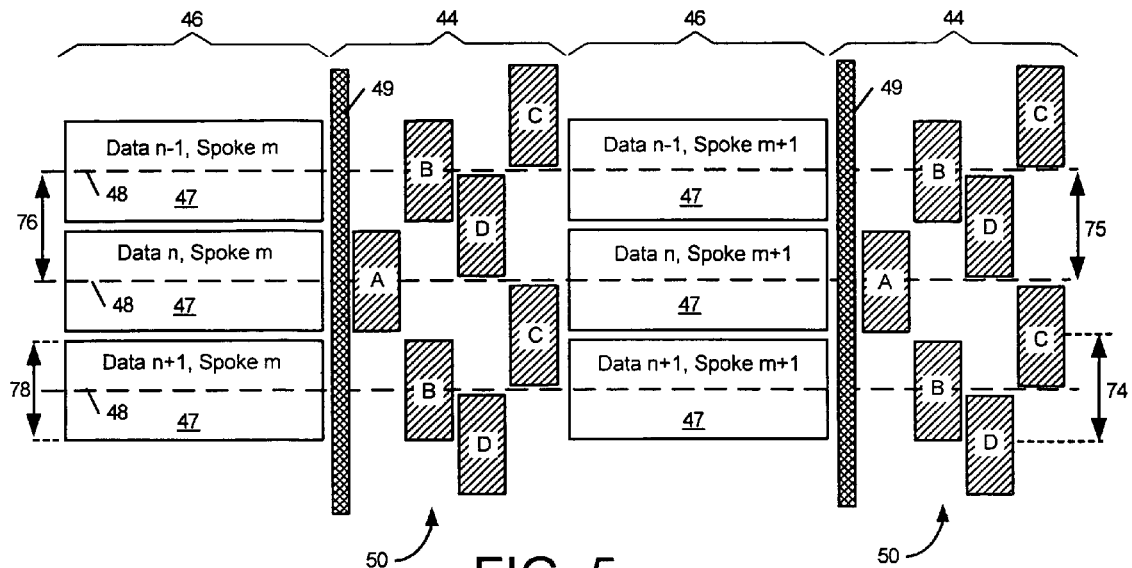
FIG. 5 is a top view of a disk, and illustrates portions of conventional tracks at radial locations n−1 to n+1.
Figure 6:
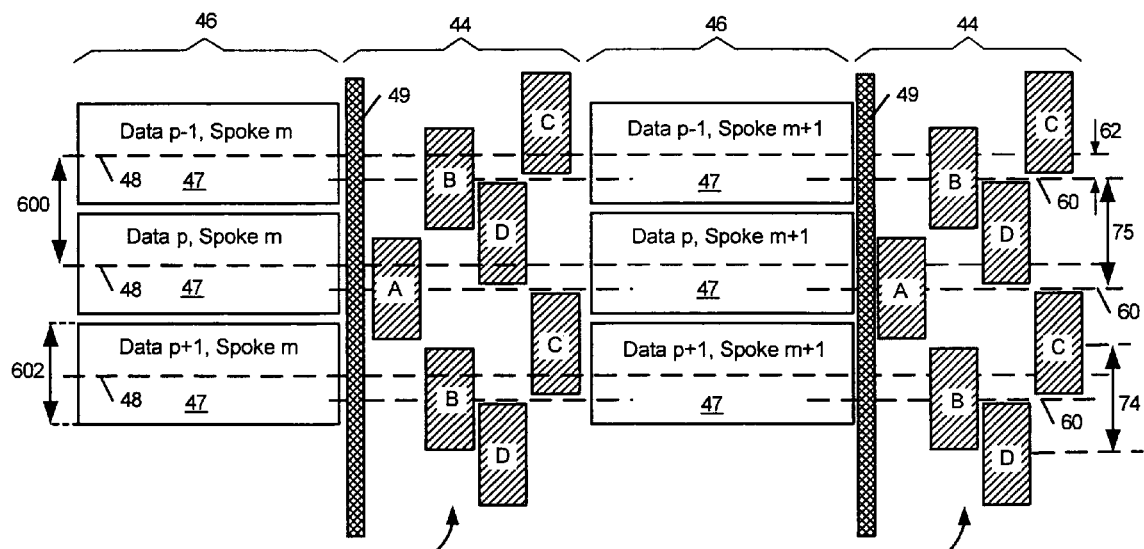
FIG. 6 is a top view of a disk, and illustrates portions of conventional tracks at radial locations p−1 to p+1.
Figure 9:
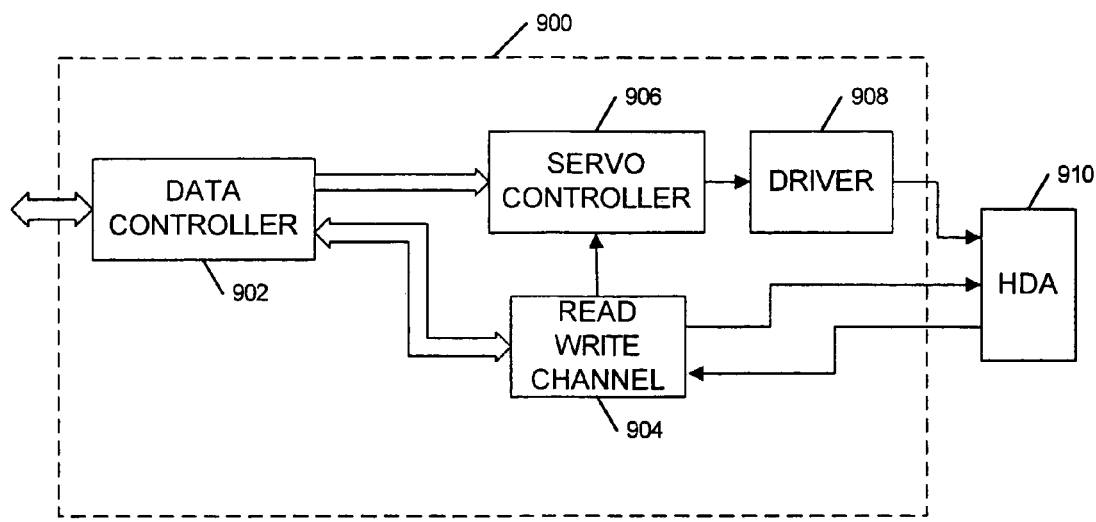
FIG. 9 is a block diagram of electronic circuits of a disk drive, such as disk drive 10 shown in FIG. 1, that are configured in accordance with some embodiments of the present invention.

FIG. 9 is a block diagram of electronic circuits 900 that are configured to position the transducer 20 based on servo burst patterns in the servo spokes 810, in accordance with various embodiments of the present invention. The electronic circuits 900, which may be included within the electronic circuits 30 of the disk drive 10 (FIG. 1), include a data controller 902, a read/write channel 904, a servo controller 906, and a driver 908, which communicates with a head disk assembly 910 (i.e., actuator arm assembly 18, VCM 28, and disk stack 12 of FIG. 1) to seek to and follow tracks on the disks 34, and to read/write from the tracks 47 thereon. The servo controller 906 is configured to operate in accordance with various embodiments of the present invention.

The data controller 902 can operate in a conventional manner to format data communicated between a host computer, or other external device, and the disks 34 through the read/write channel 904. The read/write channel 904 can operate in a conventional manner to convert data between the digital form used by the data controller 902 and the analog form used by the transducers 20. The read/write channel 904 also provides servo positional information read from the disks 34 to the servo controller 906. Transducer location information that is generated by the transducer 20 reading the servo preambles 814 and servo burst patterns 816, 817 is transferred to the servo controller 906, which uses it to perform seek and track following operations of the transducer 20 relative to data tracks 47.

In some embodiments of the present invention, the servo controller 906 is configured to position the transducer 20 relative to the data tracks 47 at radial locations n−1 to n+1 based more on the servo burst patterns 816 than based on the servo burst patterns 817. The servo controller 906 is also configured to position the transducer 20 relative to the data tracks 47 at radial locations p−1 to p+1 based more on the servo burst patterns 817 than based on the servo burst patterns 816. Because, the servo burst patterns 816 may provide more accurate information for positioning the transducer 20 relative to the tracks 47 at radial locations n−1 to n+1, and the servo burst patterns 817 may provide more accurate information for positioning the transducer 20 relative to the tracks 47 at radial locations p−1 to p+1, the transducer 20 may be more accurately positioned with respect to data tracks 47 at different radial locations on the disk 34 by relying more heavily on, or only on, which of the servo burst patterns 816, 817 that provides more accurate positioning information at that radial location.

Accordingly, the servo controller 906 may determine the radial location of a data track 47 that is to be followed, and, based on the radial location, it may rely more on the position information from one of the servo burst patterns 816, 817 when positioning the transducer 20 relative to that data track 47. For example, when the servo burst patterns 816, 817 alternate in odd and even servo spokes 810, respectively, around the disk 34, the servo controller 906 can determine that the transducer 20 is to follow one of the data tracks 47 at radial location n−1 to n+1, and can position the transducer 20 based more on the position information from the servo burst patterns 816 in the even servo spokes 810 and less on the position information from the servo burst patterns 817 in the odd servo spokes 810.

The servo controller 906 may compensate for the radial offset 818 between the servo burst patterns 816, 817 when using the position information that is generated by reading the A, B, C, D servo bursts therein. When the transducer 20 is to follow the data track 47 at radial location n, the servo controller 906 can adjust the position information from the servo burst patterns 816 and 817 to compensate for the offset 818. For example, to follow the track 47 at radial location n, the servo controller 906 can use the position information from servo burst pattern 816 of servo spoke 810 at location m without compensation, and can adjust the position information from servo burst pattern 817 of servo spoke 810 at location m+1 to compensate for the radial offset 818 between the servo burst patterns 816, 817. In contrast, to follow the track 47 at radial location p, the servo controller 906 can adjust the position information from servo burst pattern 816 of servo spoke 810 at location m to compensate for the radial offset 818, and can use the position information from servo burst pattern 817 of servo spoke 810 at location m+1 without compensation.

The servo controller 906 can include a table or other data repository that provides an indication of which radial locations of the data tracks 47 are more closely aligned with which of the servo burst patterns 816, 817, and/or the radial offset between the servo burst patterns in various ones of the servo spokes 810 (e.g., even/odd, or first, second, third, etc. servo spokes).

The preambles 814 can be configured to identify which of the servo burst patterns 816 and 817 (e.g., even spoke or odd spoke) the transducer 20 is reading. For example, a preamble 814 can be configured (e.g., written or imprinted on the disk 34) to be substantially in-phase with the A, B, C, D servo bursts in the servo burst patterns 816, and another preamble 814 may be configured to be substantially 180° out-of-phase with the A and B (indicated as "−A" and "−B") servo bursts in the servo burst patterns 817. The servo burst patterns 816 and 817 may thereby be distinguished from each other by identifying whether the preamble 814 is in-phase or out-of-phase with the A and B servo bursts. Other phase relationships between the preambles 814 and one or more of the A, B, C, D servo bursts of servo burst pattern 816 and/or 817 may be established and used to distinguish the servo burst patterns 816, 817.

Different types of servo sectors 810 (e.g., odd and even types) may alternatively, or additionally, be identified by information within the preambles 814. For example, the synchronization field and/or spoke number field in the preamble 810 can be indicative of different types of servo sectors 810. The servo controller 906 can thereby be configured to determine whether the transducer 20 is reading the servo burst pattern 816 or the servo burst pattern 817 based on the relative phase of the preambles 814 and one or more of the A, B, C, D servo bursts (FIGS. 7 and 8) and/or based on the synchronization field and/or the spoke number field of the preambles 814.

Figure 10:
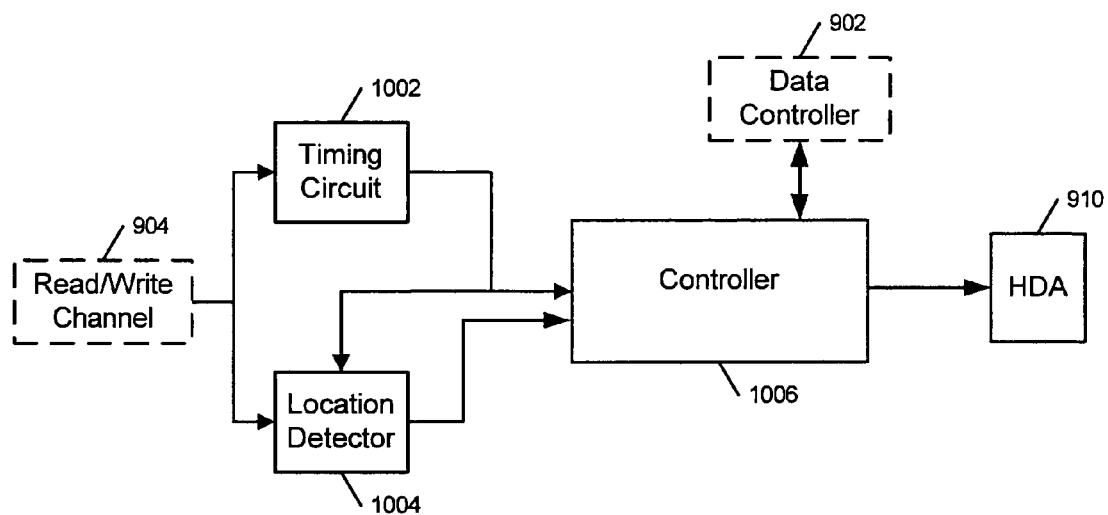
FIG. 10 is a block diagram of the servo controller of FIG. 9 in accordance with some embodiments of the present invention.

Referring to FIG. 10, the servo controller 906 can include a timing circuit 1002, a location detector 1004, and a controller 1006. The controller 1006 may be embodied in hardware and/or software, such as within one or more digital signal processors, general processor, and/or application specific integrated circuits. The timing circuit 1002 can generate clock signals synchronized with the passage of the servo burst patterns in the servo spokes 810 under the transducer 20. In response to the clock signals from the timing circuit 1002, the location detector 1004 detects transducer radial location from transducer location data provided by the read/write channel 904. The detected transducer location information in each servo spoke can provide the address of the track which contains the servo spoke, and therefore, the location of the transducer 20 relative to that track.

Figure 11:
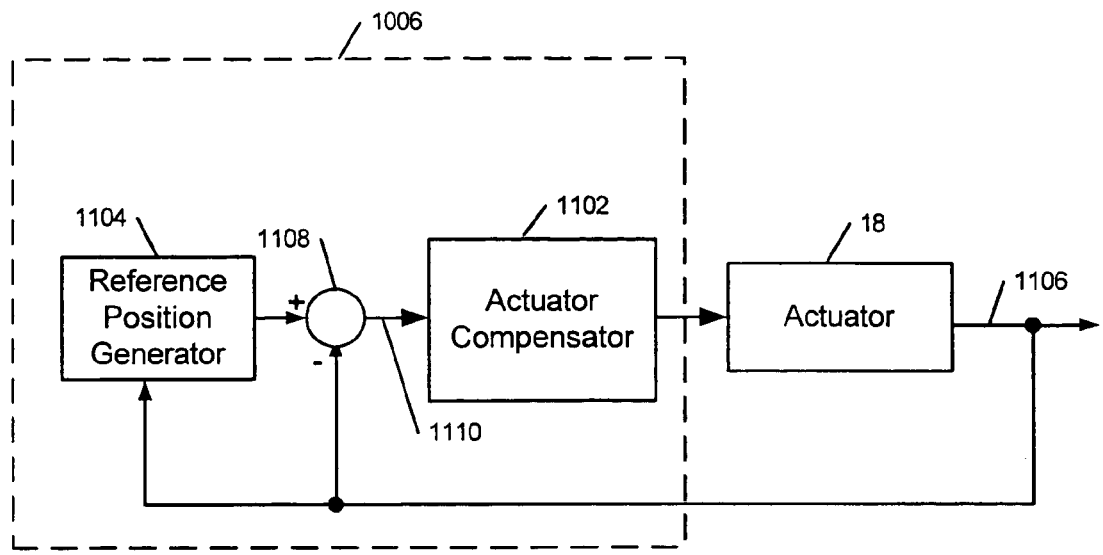
FIG. 11 is a block diagram of the controller of FIG. 10 in accordance with some embodiments of the present invention.

Referring to FIG. 11, an exemplary embodiment of the controller 1006 is shown that includes an actuator compensator 1102 and a reference position generator 1104. During a track following operation, the controller 1006 senses, via the transducer 20, the servo burst patterns 816 and 817 in the servo spokes 810 along the track to generate sensed position signals 1106, which indicate a position of the transducer 20 relative to the track. The sensed position signal 1106 is fedback to a summing node 1108, where it is combined with a desired reference position signal from the reference position generator 1104 to generate a position error signal 1110. The compensator 1102 is configured to control positioning of the transducer 20, via positioning of the actuator 18, based on the position error signal 1110, to attempt to maintain the transducer 20 on a track during track following. The desired reference position signal may be a DC value (e.g., static value), such as zero, for at least a portion of the revolution of the disks 34.

The reference position generator 1104 is configured to drive the transducer 20 toward the centerline of a data track during track following through the desired reference position signal that it outputs to the summing node 1108. The reference position generator 1104 may vary the desired reference position signal that it outputs to the summing node 1108 based on which of the servo spokes 810 the transducer 20 is reading (e.g., even spoke or odd spoke) and which the radial location of the data track 47 is to be followed.

For example, to follow data track 47 at radial location n, when the transducer 20 reads the servo burst patterns 816 in servo spoke 810 at location m, the reference position generator 1104 may output one level of desired reference position signal, such as zero volts, so that the transducer is moved toward the centerline of 820, which happens to coincide with the centerline of that data track 47. As the transducer 20 continues along that data track 47 and reads the servo bursts from the servo burst patterns 817, the reference position generator 1104 may output another level of desired reference position signal so that the transducer is moved away from the centerline of 822 of the servo burst patterns 817 toward the centerline of the data track 47 at radial location n. In contrast, when following data track 47 at radial location p, the reference position generator 1104 may output a level of the desired reference position signal that moves the transducer 20 away from the centerline of 820 of the servo burst patterns 816 toward the centerline of data track 47 at radial location p, and outputs another level of the desired reference position signal that moves the transducer toward the centerline 822 when the transducer reads from servo burst patterns 817.

Accordingly, the reference position generator 1104 may be configured to compensate for the radial offset 818 between the servo burst patterns 816, 817, and/or it may be configured to rely on the position information from one of the servo burst patterns 816, 817 more than the other one of the servo burst patterns 816, 817 based on the radial location of the data track 47 to be followed.

Figure 12:
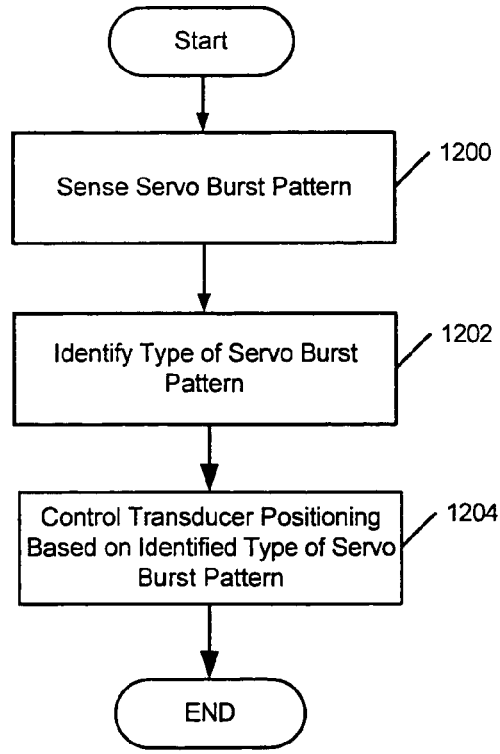
FIG. 12 illustrates a flowchart of operations for controlling positioning of a transducer, in accordance with some embodiments of the present invention.

FIG. 12 illustrates a flowchart of operations for controlling positioning of the transducer 20, in accordance with some embodiments of the present invention. These operations can be suitable for use by the servo controller 906 shown in FIG. 9, and the controller 1006 shown in FIG. 10. At Block 1200, a servo burst pattern is sensed by the transducer 20 in one of the servo spokes 810 of the disk 34 and a servo burst signal is generated therefrom. At Block 1202, the sensed servo burst pattern is identified as one of a plurality of different types of servo burst patterns (e.g., even/odd, or first, second, third, fourth, etc. types of servo burst patterns) that are in different ones of the servo spokes 44. At Block 1204, positioning of the transducer 20 is controlled based on the identified type of the sensed servo burst pattern.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A disk drive comprising:

a rotatable disk, wherein the disk comprises a first type of servo burst pattern in a first radial spoke of the disk, and a second type of servo burst pattern in a second radial spoke of the disk, the first and second types of servo burst patterns are radially offset from each other and are associated with a plurality of data tracks extending through the first and second radial spokes, the first type of servo burst pattern comprises a first preamble and a plurality of servo bursts occupying defined servo burst positions relative to one another, the first preamble and a particular one of the first servo bursts at a particular one of the servo burst positions have a first relative phase therebetween, and the second type of servo burst pattern comprises a second preamble and a second plurality of servo bursts occupying the same defined servo burst positions relative to one another as defined for the first type of servo burst pattern, the second preamble and a particular one of the second servo bursts at the particular one of the servo burst positions have a second relative phase therebetween, wherein the first relative phase is different than the second relative phase; and a controller that is configured to control positioning of a transducer relative to the tracks on the disk based on a sensed one of the first and second servo burst patterns, wherein the controller is configured to vary a contribution of the sensed servo burst pattern to positioning of the transducer based on identifying the sensed servo burst pattern as one or the other of the first and second types of servo burst patterns in response to the difference between the first and second relative phases.

2. The disk drive of claim 1, wherein the first type of servo burst pattern and the second type of servo burst pattern alternately repeat in a plurality of radial spokes around the disk.

3. The disk drive of claim 1, wherein the data tracks have a track pitch that varies radially across the disk.

4. The disk drive of claim 3, wherein:
the particular one of the first servo bursts of the first type of servo burst pattern is more closely aligned with a first one of the plurality of data tracks than the particular one of the second servo bursts of the second type of servo burst pattern; and
the particular one of the second servo bursts of the second type of servo burst pattern is more closely aligned with a second one of the plurality of data tracks than the particular one of the second servo bursts of the first type of servo burst pattern.

5. The disk drive of claim 4, wherein the controller is configured to align the transducer with the first data track based on the first type of servo burst pattern, and to align the transducer with the second data track based on the second type of servo burst pattern.

6. The disk drive of claim 4, wherein:
the controller is configured to align the transducer with the first data track based more on the particular one of the first servo bursts of the first type of servo burst pattern than on the particular one of the second servo bursts of the second type of servo burst pattern, and to align the transducer with the second data track based more on the particular one of the second servo bursts of the second type of servo burst pattern than on the particular one of the first servo bursts of the first type of servo burst pattern.

7. The disk drive of claim 1, wherein:
the controller is configured to identify the sensed servo burst pattern as the first type of servo burst pattern in response to the preamble and the particular one of the plurality of servo bursts at the particular one of the servo burst positions of the sensed servo burst pattern being substantially in phase with each other and to identify the sensed servo burst pattern as the second type of servo burst pattern in response to the preamble and the particular one of the plurality of servo bursts of the sensed servo burst pattern being substantially out of phase with each other.

8. The disk drive of claim 1, wherein:
the first type of servo burst pattern comprises a spoke number field that is indicative of the first type of servo burst pattern;
the second type of servo burst pattern comprises a spoke number field that is indicative of the second type of servo burst pattern; and
the controller is configured to further identify the sensed servo burst pattern as one of the first and second types of servo burst patterns based on the spoke number field of the sensed servo burst pattern.

9. The disk drive of claim 1, wherein:
the first type of servo burst pattern comprises a synchronization field that is indicative of the first type of servo burst pattern;
the second type of servo burst pattern comprises a synchronization field that is indicative of the second type of servo burst pattern; and
the controller is configured to further identify the sensed servo burst pattern as one of the first and second types of servo burst patterns based on the synchronization field of the sensed servo burst pattern.

10. The disk drive of claim 1, wherein the controller is configured to identify the sensed servo burst pattern as the first type of servo burst pattern in response to the sensed servo burst pattern having the first relative phase between a preamble and a particular one of A, B, C, and D bursts of the sensed servo burst pattern, and to identify the sensed servo burst pattern as the second type of servo burst pattern in response to the sensed servo burst pattern having the second relative phase between the preamble and the particular one of the A, B, C, and D bursts of the sensed servo burst pattern.

11. A method of controlling positioning of a transducer that is adjacent to a rotatable disk in a disk drive, the method comprising:
sensing a servo burst pattern in a radial spoke of the disk;
identifying the sensed servo burst pattern as one of a plurality of different types of servo burst patterns which are in different radial spokes of the disk; and
controlling positioning of the transducer based on the identified type of the sensed servo burst pattern, wherein:
the sensed servo burst pattern comprises a preamble and a plurality of servo bursts;
identifying the sensed servo burst pattern as one of a plurality of different types of servo burst patterns comprises identifying the type of servo burst pattern based on a relative phase of the preamble and at least one of the plurality of servo bursts; and
controlling positioning of the transducer based on the identified type of the sensed servo burst pattern comprises varying a contribution of the sensed servo burst pattern to positioning of the transducer relative to a data track on the disk based on the identified type of the sensed servo burst pattern.

12. A method comprising:
identifying a sensed servo burst pattern as a first type of servo burst pattern when a preamble and an ordered one of plurality of servo bursts of the sensed servo burst pattern have a first relative phase therebetween, and identifying the sensed servo burst pattern as a second type of servo burst pattern when the preamble and the ordered one of the plurality of servo bursts have a second relative phase therebetween that is different than the first relative phase; and
controlling positioning of a transducer relative to tracks on a disk by varying a contribution of the sensed servo burst pattern to positioning of the transducer based on identifying the sensed servo burst pattern as one or the other of the first and second types of servo burst patterns in response to the difference between the first and second relative phases.

13. The method of claim 12, wherein controlling positioning of the transducer comprises positioning the transducer relative to the first and second types of servo burst patterns which are radially offset to each other.

14. The method of claim 12, wherein controlling positioning of the transducer comprises positioning the transducer relative to a plurality of data tracks having a track pitch that varies radially across the disk, a particular one of the first servo bursts of the first type of servo burst pattern is more closely aligned with a first data track on the disk than with a second data track on the disk, and the second type of servo burst pattern is more closely aligned with the second data track than with the first data track.

15. The method of claim 14, wherein controlling positioning of the transducer comprises positioning the transducer relative the first data track based more on the first type of servo burst pattern than based on the second type of servo burst pattern, and positioning the transducer relative the second data track based more on the second type of servo burst pattern than based on the first type of servo burst pattern.

16. The method of claim 12, wherein identifying the sensed servo burst pattern comprises:
   identifying the sensed servo burst pattern as the first type of servo burst pattern when the preamble and the ordered one of the plurality of servo bursts are in phase with each other; and
   identifying the sensed servo burst pattern as the second type of servo burst pattern when the preamble and the ordered one of the plurality of servo bursts are substantially out of phase with each other.

* * * * *